March 24, 1942.    G. L. CADWELL    2,277,297
REAPER ATTACHMENT
Filed Sept. 26, 1940    2 Sheets-Sheet 2
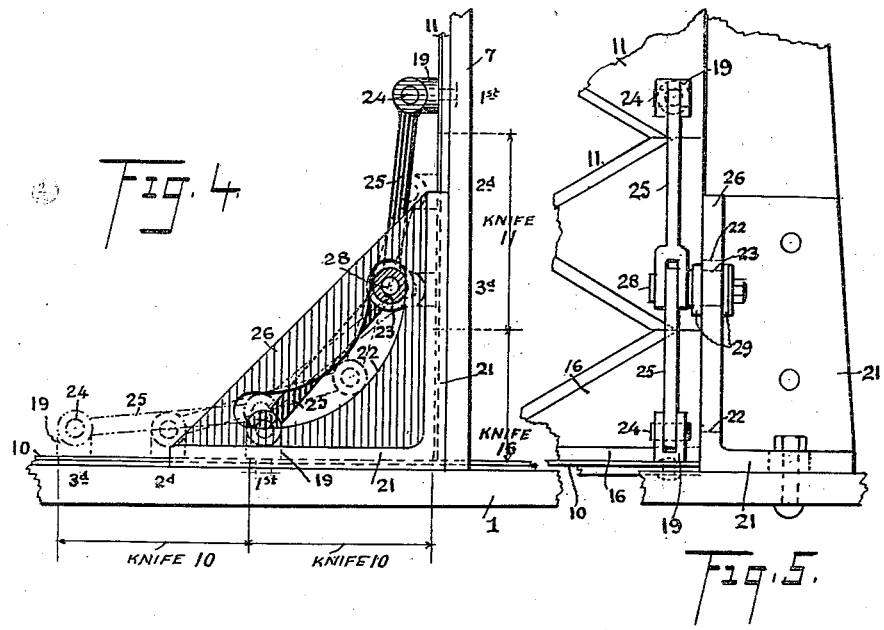
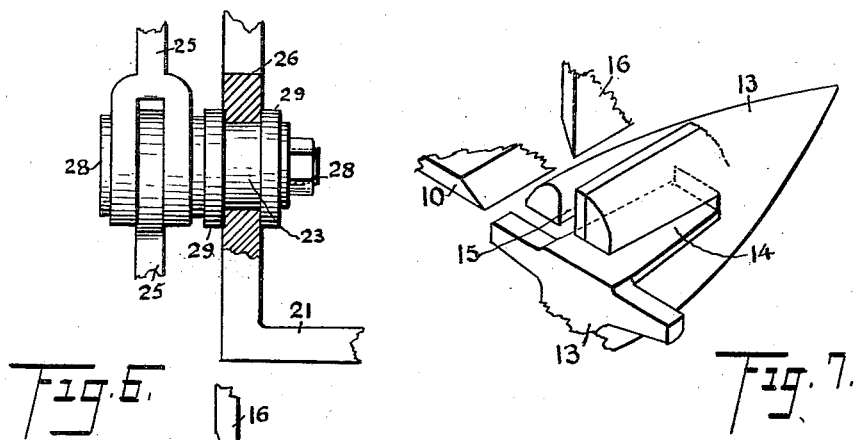
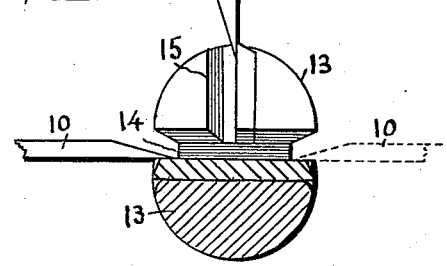
George L. Cad    INVENTOR.
BY    N. S. Amstutz
ATTORNEY.

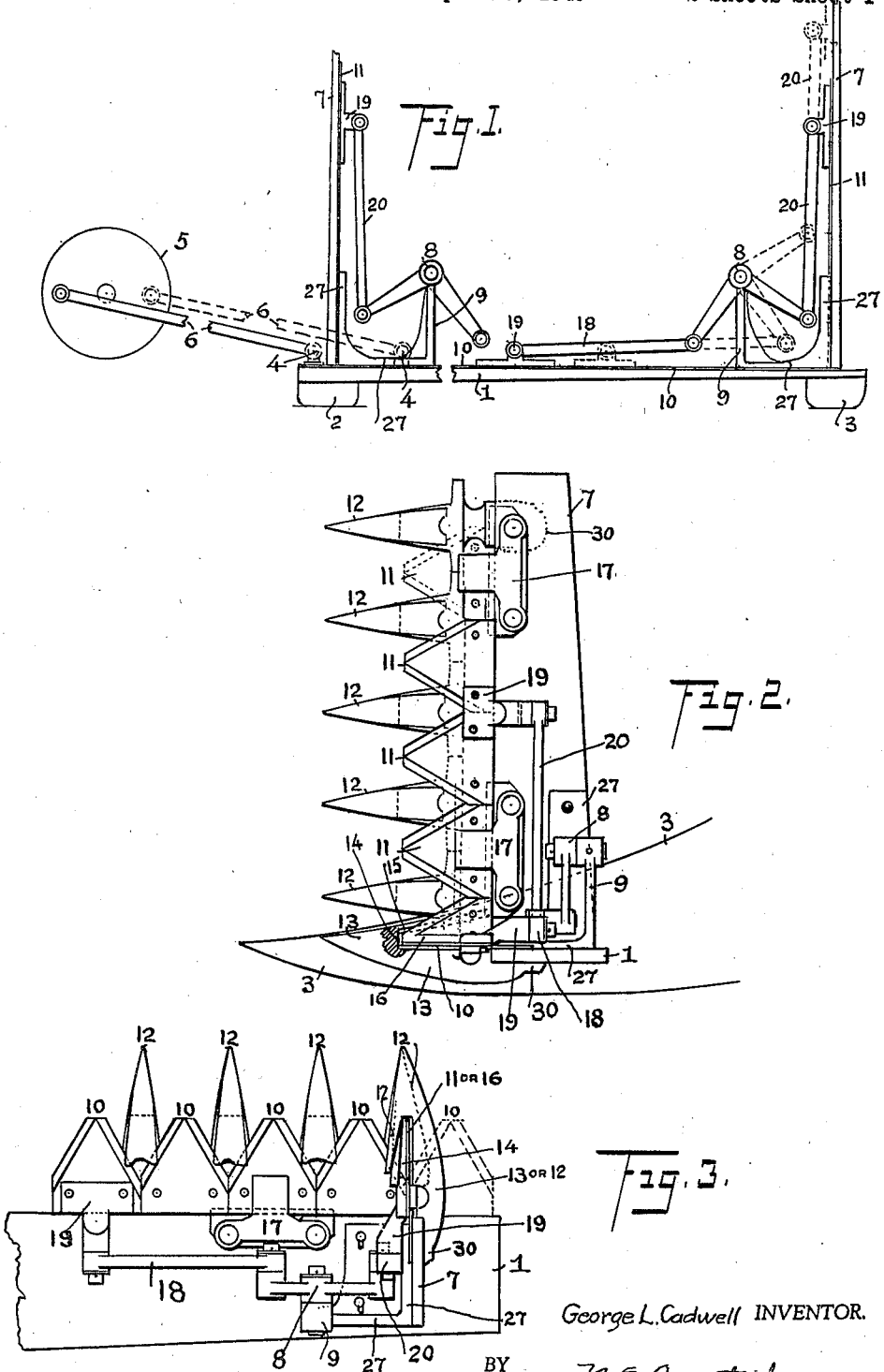

Patented Mar. 24, 1942

2,277,297

UNITED STATES PATENT OFFICE 2,277,297

REAPER ATTACHMENT

George L. Cadwell, Valparaiso, Ind.

Application September 26, 1940, Serial No. 358,517

2 Claims. (Cl. 56—316)

My invention relates to improvements in reaper attachments and it more especially consists of the features pointed out in the annexed claims.

The purpose of my invention is to overcome the clogging of uncut material at the ends of mower and reaper cutter bars: that overcomes the nuisance to which all operators of mowing and reaping machines, and combines are subject to, which causes the operator to get off the machine and manually pull away the accumulation of grain or grass that has not been cut; that provides one or more supplementary lightweight cutter bars that are attached vertically to an ordinary horizontal bar; that is provided with guards and with cutter sections or knives the same as are found on conventional reaping machines; that provides a special guard at the intersection of the horizontal bar with the vertical bar; and that produces movement of the vertical sickles from the usual reciprocating knife in any cooperating manner.

With these and other ends in view I illustrate in the accompanying drawings such instances of adaptation as will disclose the broad underlying features of my invention without limiting myself to the specific details shown thereon and described herein.

Fig. 1 is a schematic diagram showing a bell crank and link connection to change movements of a horizontal moving sickle bar to a vertically moveable bar.

Fig. 2 is an elevation of the outer end of a cutter bar and its attachment.

Fig. 3 is a top plan view of Fig. 2.

Fig. 4 is a side elevation looking forward of a modification of the movement shown on Figs. 2 and 3.

Fig. 5 is an elevation of Fig. 4.

Fig. 6 is an enlarged elevation, partly in section of the details of Fig. 5.

Fig. 7 is a perspective of a special corner guard.

Fig. 8 is an enlarged cross section of a special corner guard.

In the actual use of my device I may employ whatever alternatives or equivalents of structure that the exigencies of varying conditions may demand without departing from the broad spirit of the invention.

At the outer or inner end of the usual cutter bar 1 I attach a short length cutter bar 7 standing vertically. Such a vertical bar is attached to the usual bar 1 by any desired form of angle braces 21 or 27. The angle 27 serves as a support or fulcrum for a bell crank 8 which transmits the horizontal to and fro motion of the regular knives 10 to a corresponding reciprocating motion of the vertical knives 11. As stated the same expedient may be used at both ends of the cutter bar 1. These auxiliary cutter bars 7 may be adjusted in any conventional manner cross-wise of the main bar if desired. The main purpose of these auxiliary bars 7 is to cut off accumulations that very frequently occur at these points and cause clogging. By reason of the auxiliary cutting bars the accumulations are cut away. The bars 7 are relatively short, approximately four "knives" long.

To accommodate the arc of movement of the ends of the bell crank 8, connecting links 18 and 20 are pivoted to each arm of the bell crank and to the respective bars, containing the cutting knives 10 and 11. The connecting links are pivotally attached by means of blocks 19 to the knife bars, which attachment may be at the usual rivet holes formed in the knives.

Corner brackets 21 and 27 are riveted to the horizontal bar 1 and to the vertical bar 7. The corner bracket 27 by its support 9 serves as a fulcrum or pivot for the bell crank 8. The usual clips 17 hold the reciprocating bars on which knives 10 and 11 are attached against displacement out of their path of travel on the stationary bars 1 and 7.

In order that the lowest knife of the vertical knives 17 will come into close operative relation to the horizontal knife 10 passing beneath it, the lowest knife 16 of the vertical group is cut in half. It slides in a vertical shearing slot 15 formed in a special corner guard 13. This guard has the usual horizontal ledger plate and an open slot 14 through which the regular knives 10 pass back and forth. The vertical cutter bars 7 may be made of any desired lightweight material so as to not add any excessive weight to the outer end of conventional cutter bars 1. Any desired combination of the swath boards (not shown) may be added to the outer shoe 3 as desired.

The usual cutter bar 1 is provided with an inner shoe 2 and an outer shoe 3. These shoes usually slide on the ground. The horizontal knives 10 are all attached to a reciprocating bar which has a knife head 4. The knife head is connected to a pitman 5 by a connecting rod 6. Between each of the horizontal moving knives 10 and the vertically moving knives 11 conventionally shaped guards 12 are placed. These are attached at 30 to the cutter bars 1 and 7.

A modification of the connecting links 18 and 20 and the crank 8 is shown in Figures 4–6. This includes a corner brace 21 that serves to hold the vertical cutter bar 7 attached to the horizontal bar 1. It has a curved rib 26 in which a curved slot 22 is formed. The vertical moving knives 11 and the horizontal moving knives 10 are pivotally attached by supports 19 at 24 to inter-pivoted links 25. The links 25 are pivoted to each other by a shouldered pin 28. On a reduced diameter of this pin a roller 23 is positioned. It has flanges 29 that engage the sides of the curved rib 26 and serve to hold the links 25 from any movement away from the rib 26. The roller is held in place on the pin 28 by a washer engaging a smaller diameter shoulder and a conventional nut. A loose washer may be placed on the intermediate diameter of the pin 28 between the roller 23 and one of the links 25.

Whether I use a bell crank with its attaching links shown in Figures 1, 2, and 3 or the modification shown in Figures 4–6 or any other form of translating device is immaterial because they all fall within the inclusive breadth of the invention.

What I claim is:

1. In a reaping machine attachment, a horizontal cutter bar, a reciprocating knife or sickle movable on the bar, a supplemental vertical cutter bar attached to the horizontal bar, a reciprocating sickle in the vertical bar, means for coordinating the movement of the two separate knives so as to cause the vertical knife to come into close engagement with the horizontal knife at their point of intersection, a unitary guard at the intersection of the two knives provided with a cutting edge on a horizontal plane, a second cutting edge on a vertical plane positioned directly above the horizontal cutting edge, and means for translating the movement of the horizontal knife into vertical movement on the vertical knife.

2. A guard for mowing machines adapted to provide two cutting edges in angular relation to each other for the simultaneous cutting operation of adjacently positioned sickles which comprises a single piece guard having horizontal and vertical openings, a plate forming the under side of the horizontal opening said plate being provided with two cutting edges, a plate having a single cutting edge in the vertical opening, said single cutting edge being approximately on the same plane as the top surface of the guard and the said openings being connected with each other.

GEORGE L. CADWELL.